B. W. Tucker,
Paddle Wheel.
No. 100,820          Patented Mar. 15, 1870.
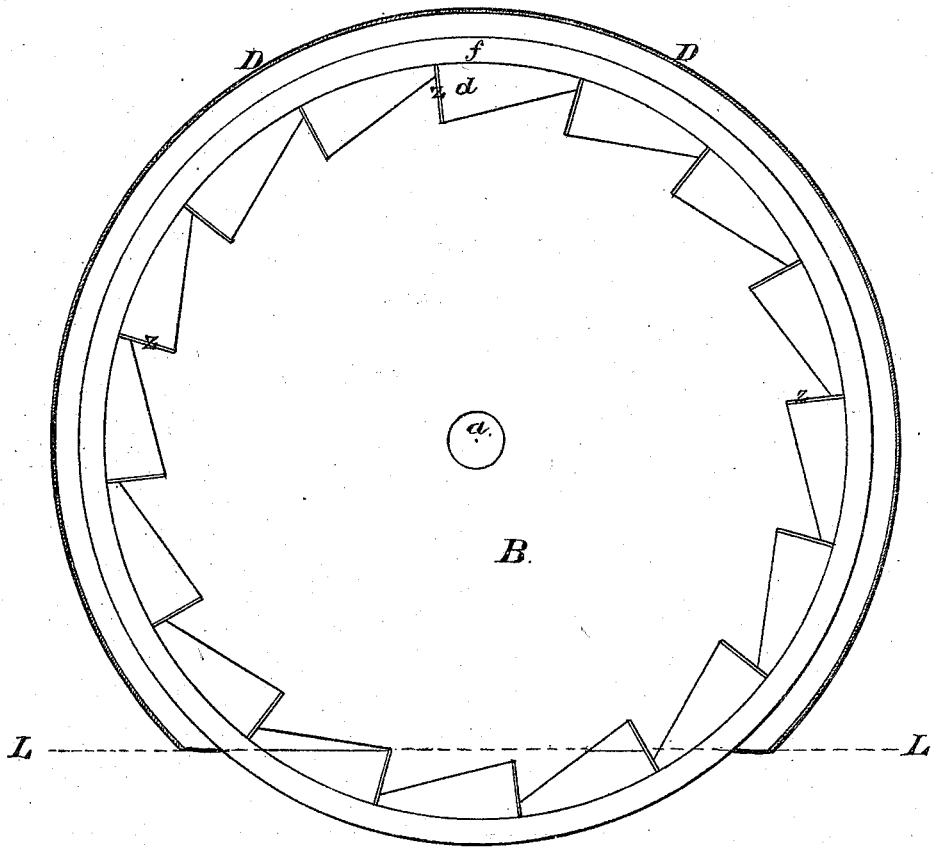
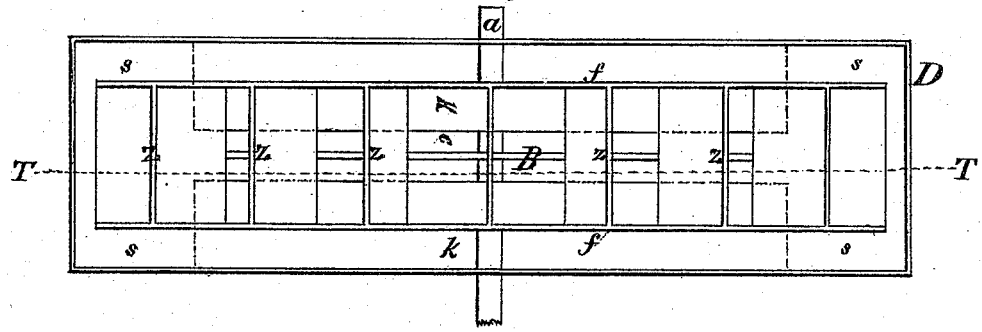
Witnesses,
Ch. Sidney Whitman
H. A. Daniels
Inventor,
Benjamin W. Tucker
Lincoln & Willard
Attys

United States Patent Office.

BENJAMIN W. TUCKER, OF BROOKLYN, NEW YORK.

Letters Patent No. 100,820, dated March 15, 1870.

IMPROVEMENT IN PADDLE-WHEELS.

The Schedule referred to in these Letters Patent and making part of the same.

I, BENJAMIN W. TUCKER, of the city of Brooklyn, in the State of New York, have invented a new and useful and improved Submerged Paddle-Wheel, of which the following is a specification.

Nature and Objects of the Invention.

My invention relates to providing each bilge of a vessel with a disk of requisite proportions, having teeth or projections on its periphery which incline outward at an angle of about thirty-seven degrees from the base of one to the point of another, thence vertically inward to the periphery of the disk. The vertical edges of these projections are in the lines of the radii, from the common center on which the disk revolves. To these edges are attached, at their lateral centers, buckets or paddles, the ends of which are secured on both sides to hollow vertical disks or rims. This arrangement is rigidly hung upon a shaft through its center, which works in water-tight apertures in the center of the casing. The disk and attached buckets are encased in a water-tight compartment, the superfices of which conform to the spaces in which the disk and buckets revolve, its interior being sufficiently large to allow the disk and buckets to revolve freely. There is, however, a segment removed from its under side, and the compartment is so attached to the vessel that the cord of the segment of the part cut off is flush with the vessel's bottom, below the plane of which the paddles and rims project.

The water-tight compartment being attached to the vessel in such manner that the lips or edges of the horizontal part thereof is flush with the vessel's bottom, the compartment becomes filled with water, which is confined therein, and the wheel, consisting of the disk and buckets is submerged upon power being applied to the crank or shaft to which the disk is rigidly secured. It revolves, bringing the surfaces of the buckets successively in contact with the water below the plane of the vessel's bottom, thereby propelling it.

Description of the Accompanying Drawings.

Figure 1 is a vertical section of the invention, through the line T T.

The dotted line L L indicates the plane of the vessel's bottom.

Figure 2 is a top view of the invention, with the upper half of the water-tight casing removed.

General Description.

B is the disk rigidly attached to the shaft $a$, and provided with the teeth or projections $d$, to the vertical edges of which are attached the buckets Z.

$f$ are the rims or vertical hollow disks to which the lateral edges of the buckets are secured.

C is the space within which the disk revolves, and $k$ are the exterior circular recesses of similar diameter to that of the disk B, which are enlarged into the circular hollow shoulders $s$, in which the buckets $z$ revolve.

D is the exterior of the water-tight compartment in which the wheel revolves.

L L is the dotted line indicating the plane of the vessel's bottom.

To operate the invention, the bilges of the vessel are each provided with openings through the bottom of the vessel of a size corresponding to the part of the device from which the segment of the water-tight compartment has been cut out, which open part is placed directly over the aperture, and securely fastened in such position in such manner as to prevent the ingress of water, as shown in fig. 1.

By this arrangement the buckets exposed by the cutting out of the said portion of the casing are below the line L L, and consequently in contact with the water which has filled the compartment, thus submerging the wheel within.

Upon power being applied at the crank $a$ the disk B is revolved, thus bringing the buckets $z$ successively in contact with the water below the line L L, and propelling the vessel.

The compartment D may be provided with a man-hole and plate, so that the wheel within can be inspected or repaired.

If it is desired to run the vessel under canvas to economize steam, open the man-hole and remove as many of the buckets as occupy the space below the horizontal part of D; cause the wheel to revolve until the part from which the buckets have been removed is below. Thus there is exposed to the progress of the vessel only the edges of the rims $f$.

Claims.

What I claim as my invention, and desire to secure by Letters Patent, is—

1. The wheel consisting of the disk B, with the projections $d$ and buckets Z attached thereto, operating in the circular hollow water-tight compartment D, substantially as and for the uses and purposes herein described and shown.

2. The hollow water-tight compartment D, in combination with the wheel, consisting of the disk D, with the projections $d$ and buckets Z, substantially as and for the uses and purposes herein described and specified.

3. The arrangement and combination of the parts herein shown, in relation to each other and to the bottom of the vessel, substantially as herein shown and described.

BENJAMIN W. TUCKER.

Witnesses:
A. GRANT,
I. DALFORD.